(12) United States Patent
Procida

(10) Patent No.: US 8,302,634 B2
(45) Date of Patent: Nov. 6, 2012

(54) METHOD OF PRODUCING A FLEXIBLE PIPE AND A FLEXIBLE PIPE

(75) Inventor: Inger-Margrete Procida, Hellerup (DK)

(73) Assignee: National Oilwell Varco Denmark I/S, Brondby (DK)

( * ) Notice: Subject to any disclaimer, the term of this patent is extended or adjusted under 35 U.S.C. 154(b) by 1244 days.

(21) Appl. No.: 12/089,321

(22) PCT Filed: Oct. 10, 2006

(86) PCT No.: PCT/DK2006/050056
§ 371 (c)(1),
(2), (4) Date: Apr. 4, 2008

(87) PCT Pub. No.: WO2007/042049
PCT Pub. Date: Apr. 19, 2007

(65) Prior Publication Data
US 2008/0258350 A1    Oct. 23, 2008

(30) Foreign Application Priority Data

Oct. 11, 2005 (DK) .................................. 2005 01422

(51) Int. Cl.
*F16L 11/00* (2006.01)
(52) U.S. Cl. ........................................ 138/139; 138/138
(58) Field of Classification Search .............. 138/133, 138/134, 138, 139, 148, 172; 428/36.91, 428/35.8, 36.9; 264/448, 476, 477
See application file for complete search history.

(56) References Cited

U.S. PATENT DOCUMENTS
3,554,999 A * 1/1971 Shaw et al. ................... 264/514

(Continued)

FOREIGN PATENT DOCUMENTS
DE   197 42 207   10/1998
(Continued)

OTHER PUBLICATIONS

"API Recommended Practice 17B", "4.3.4 Integrated Service Umbilicals", "4.3.5. Multibores", p. 16.

(Continued)

*Primary Examiner* — Davis Hwu
(74) *Attorney, Agent, or Firm* — Pearne & Gordon LLP

(57) ABSTRACT

The invention relates to a method of producing a flexible pipe comprising a metal carcass and an internal sealing sheath extruded onto the carcass, said 5 method comprising providing a metal carcass; heating an application section of said carcass, preferably using induction heating, to an application section temperature of at least 150° C.; extruding a non-cross-linked polyethylene material comprising a peroxide having an activation temperature above 150° C. onto said application section of said carcass; cross-linking the extruded 10 polyethylene in a cross-linking zone by raising its temperature to at least the activation temperature of said peroxide by exposing the extruded polymer material to electromagnetic waves, with a wavelength of between 0.5 μm to 0.5 m, preferably infrared radiation; and cooling said cross-linked polyethylene material to obtain the internal sealing sheath. 15 In a preferred embodiment the method comprises heating the application section to an application section temperature of between 30 and 5° C. below the activation temperature of the peroxide. 20 Preferred peroxides include butylcumyl peroxide, dicumyl peroxide, 2,5-Dimethyl-2,5-di(tert-butylperoxy)hexyne-3,3, 3,5,7,7-Pentamethyl-1,2,4-trioxepane, hydroperoxide, 2,5-dimethyl hexane 2,5-di-t-butyl peroxide, bis(t-butylperoxy isopropyl)benzene, t-butyl cumyl peroxide, di-t-butyl peroxide, 2,5-dimethyl hexine-3 2,5-di-t-butyl peroxide and butylhydroperoxide. 25 A foil may be applied onto the metal carcass prior to the step of heating the metal carcass, the polyethylene material being extruded onto said foil. 30

39 Claims, 1 Drawing Sheet

U.S. PATENT DOCUMENTS

| | | |
|---|---|---|
| 4,144,111 A * | 3/1979 | Schaerer ............... 156/187 |
| 5,993,922 A | 11/1999 | Babrowicz et al. |
| 6,085,799 A | 7/2000 | Kodaissi et al. |
| 6,123,114 A | 9/2000 | Seguin et al. |
| 6,282,933 B1 | 9/2001 | Dupoiron |
| 6,494,917 B1 | 12/2002 | McKellop et al. |
| 6,840,286 B2 | 1/2005 | Espinasse et al. |
| 6,889,718 B2 | 5/2005 | Glejbøl et al. |
| 2005/0221033 A1 | 10/2005 | Procida |

FOREIGN PATENT DOCUMENTS

| | | |
|---|---|---|
| DE | 19742207 C1 | 10/1998 |
| EP | 487 691 | 12/1991 |
| EP | 1416502 | 5/2004 |
| FR | 2565887 | 12/1985 |
| GB | 1592958 | 11/1977 |
| WO | WO 00/36324 | 6/2000 |
| WO | WO 01/61232 A1 | 8/2001 |
| WO | WO 01/81809 A1 | 11/2001 |
| WO | WO 02.095281 A1 | 11/2002 |
| WO | WO 03/078134 A1 | 9/2003 |
| WO | 2004032799 A2 | 4/2004 |
| WO | WO 2004/032799 A2 | 4/2004 |
| WO | WO 2005/028198 A1 | 3/2005 |

OTHER PUBLICATIONS

"Citation List for FLEX-PA0501 Family", NKT Holding A/S Group IP, One Page.

* cited by examiner

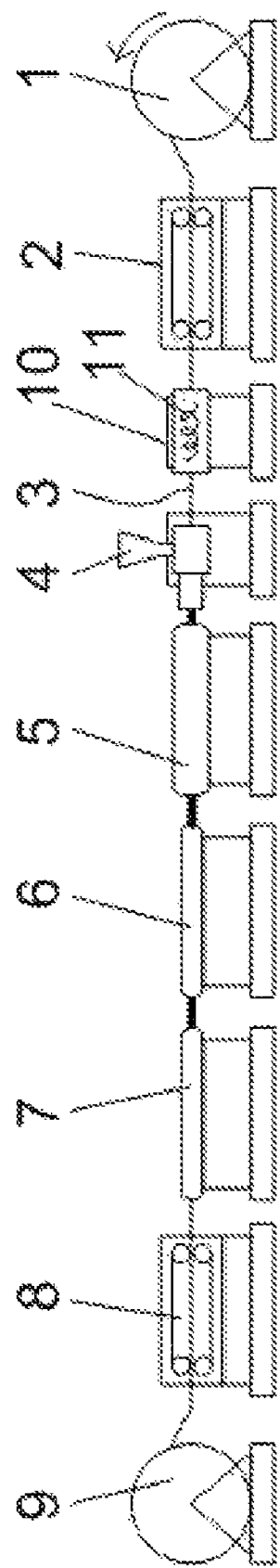

METHOD OF PRODUCING A FLEXIBLE PIPE AND A FLEXIBLE PIPE

TECHNICAL FIELD

The invention relates to a method of producing a flexible pipe comprising an internal sheath of cross-linked polyethylene (PEX) and an inner armouring liquid pervious layer called a carcass.

Flexible pipe of this type is in particular useful in water transportation, and in offshore transportation of crude oil e.g. from seabed to an installation or between installations.

BACKGROUND ART

Flexible pipes comprising a carcass and an inner sealing sheath (also called an inner liner) are well known in the art and are generally used for the transportation of oil and gas products over long distances and often at elevated temperatures, such as above 60° C. or more.

The flexible pipes for offshore use are often unbounded pipes. The term "unbounded" means in this text that at least two of the layers of the pipe are not bonded to each other. Often unbounded flexible pipes comprise an internal sheath which forms a barrier against the outflow of the fluid which is conveyed through the pipe, and one or more armouring layers on the outer side of the internal sheath (outer armouring layer(s)). The flexible pipe may comprise additional layers such as a carcass which is an inner armouring layer to prevent the collapse of the internal sheath. An outer sheath may be provided with the object of forming a barrier against the ingress of fluids from the pipe surroundings to the armouring layers. In practice the pipe will comprise at least two armouring layers, which are not bonded to each other directly or indirectly via other layers along the pipe. Thereby the pipe becomes bendable and sufficiently flexible to roll up for transportation.

Typical unbounded flexible pipes are e.g. disclosed in WO0161232A1, U.S. Pat. Nos. 6,123,114 and 6,085,799.

The above-mentioned type of flexible pipes is used, among other things, for off-shore as well as some on-shore applications for the transport of fluids and gases. Flexible pipes can e.g. be used for the transportation of fluids where very high or varying water pressure exists along the longitudinal axis of the pipe, such as riser pipes which extend from the seabed up to an installation on or near the surface of the sea, pipes for transportation of liquid and gases between installations, pipes which are located at great depths on the seabed, or between installations near the surface of the sea.

In traditional flexible pipes, the one or more outer armouring layers are most often in the form of helically wound steel wires e.g. shaped as profiles, where the individual layers may be wound at different winding angle relative to the pipe axis.

When using such prior art flexible pipes for transportation of aggressive gases, raw oils and similar fluids, the pipe should be constructed to resist corrosion of the armouring layers. This may e.g. be provided by protecting the armouring layer from diffusion of aggressive gasses through the internal sheath e.g. by applying a gas barrier layer to prevent the diffusion e.g. as described in WO05028198.

The internal sheath should be chemically stable and mechanically strong even when subjected to high temperatures. Furthermore, the internal sheath should be manufactured in one piece since repair, welding or other types of connecting methods are not acceptable for internal sheaths in offshore pipelines. The internal sheath is therefore normally produced by continuous extrusion of a polymer. A number of polymers are presently used for the production of internal sheaths, such as Polyamide-11 (PA-11), polyethylene (PE) and Polyvinylidene difluoride (PVDF).

These materials shall fulfil the combined requirements of e.g. heat stability, resistance to crude oil, seawater, gases, mechanical fatigue, ductility, strength, durability and processability. The internal sheath material is normally selected on a case-to-case basis after careful investigation of the conditions for the planned installation. Here, cross-linked polyethylene may in many cases prove to fulfil the requirements.

Additionally, the interest in use of internal sheaths in corrosive applications with high concentrations of carbon dioxide and/or hydrogen sulphides is increasing. Furthermore, polyamides are susceptible to hydrolysis. However, the permeability of gases increases with temperature, and polyethylene has a relatively high permeability to gases. Thus, permeation of gases like methane, carbon dioxide and hydrogen sulphide may in some cases be prohibitive for use of cross-linked polyethylene internal sheaths at high temperatures unless the internal sheath is provided with an additional gas barrier foil between the fluid to be transported and the polyethylene material.

In EP 487 691 it has been suggested to use an internal sheath of cross-linked polyethylene. An internal sheath with such cross-linked material has proved to be highly improved compared to internal sheaths of the similar non-cross-linked (thermoplastic) material.

In order not to degrade the material, the process in the prior art of producing an internal sheath is carried out in two steps, first the material in non-cross-linked form is manufactured by extrusion, and afterwards the material is cross-linked. When the material is cross-linked, it is difficult to change its shape without degrading the material.

The cross-linking step disclosed in EP 487.691 is very cumbersome and time and space demanding, and furthermore it has been found that the cross-linking degree obtainable by using this method is extremely low and not homogenous through the layer.

In the co-pending application WO03078134 filed by applicant is disclosed a process of producing a flexible pipe e.g. comprising a carcass and an internal sheath of a cross-linked polyethylene material. The process comprises the steps of shaping a polyethylene material comprising a peroxide by extrusion onto the carcass in an extrusion station and cross-linking the extruded polyethylene material by exposing the extruded polymer material to electromagnetic waves, selected from the group consisting of infrared radiation and microwave. By this method it has been found to be possible to obtain a much higher degree of cross-linking, e.g. in area of about 80%. However, it is still desirable to obtain an even higher cross-linking degree of the polyethylene material. Furthermore, the method disclosed in WO03078134 for the production of an internal sheath has been found to result in a polyethylene internal sheath with an inhomogeneous degree of cross-linking in the thickness direction of the internal sheath.

DISCLOSURE OF INVENTION

The object of the present invention is to provide a method of producing a flexible pipe comprising an internal sheath of cross-linked polyethylene, wherein the cross-linking degree is improved compared to when using prior art methods.

A further object of the invention is to provide a method of producing a flexible pipe comprising an internal sheath of cross-linked polyethylene, wherein it is possible to obtain an increased homogeneity of the cross-linking degree through the thickness layer of the internal sheath.

Yet a further object of the invention is to provide a flexible pipe comprising an internal sheath of cross-linked polyethylene, wherein the internal sheath is increased in strength.

The above objects of the invention are achieved by the invention and embodiments of the inventions as defined in the accompanying claims and as described in the following.

The term "flexible pipe" includes both the traditional types of flexible pipes such as flow lines and risers, as well as umbilicals wherein the umbilical has an internal armouring (a carcass) and an internal sheath.

In one embodiment, the flexible pipe is a flow line or a riser.

In one embodiment, the flexible pipe is an umbilical. The umbilical may in one embodiment comprise an inner core which is as the flexible pipe described below i.e. comprising from inside out a carcass, an internal sealing sheath and optionally one or more armouring layers and one or more additional polymer layers. This inner core provides the axial load bearing capacity of the structure. Around the inner core of the umbilical are the umbilical components wound helically or sinusoidally. The umbilical components may be any additional pipes, cables or lines, such as electrical, hydraulic and control lines or pipes for injection of water, methanol or other liquids.

Further information about umbilicals can e.g. be found in. Recommended Practice for Flexible pipe, API 17B, second edition, Jul. 1, 1998, section 4.3.4.

In one embodiment the flexible pipe is a multibore i.e. a combination of multiple flexible pipes and/or umbilicals. Further information about multibores can e.g. be found in. Recommended Practice for Flexible pipe, API 17B, 25 second edition, Jul. 1, 1998, section 4.3.5.

The method of the invention of producing a flexible pipe comprising a metal carcass and an internal sealing sheath extruded onto the carcass comprises the steps of
  providing a metal carcass;
  heating an application section of said carcass to an application section temperature of at least 150° C.;
  extruding a non-cross-linked polyethylene material comprising a peroxide having an activation temperature above 150° C. onto said application section of said carcass;
  cross-linking the extruded polyethylene in a cross-linking zone by raising its temperature to at least the activation temperature of said peroxide by exposing the extruded polymer material to electromagnetic waves, with a wavelength of between 0.5 µm to 0.5 m; and
  cooling said cross-linked polyethylene material to obtain the internal sealing sheath.

The "application section of the carcass" means the section of the carcass onto which the non-cross-linked polyethylene material is about to be applied by extrusion.

Thus, it has surprisingly been found that by heating the section of the carcass onto which the non-cross-linked polyethylene material is about to be applied by extrusion, the resulting cross-linked internal sealing sheath (often called an internal sheath) is improved in strength mainly due to an increased cross-linking of the cross-linked polyethylene (PEX) material. Also it is believed that the increased strength of the resulting internal sealing sheath may be a result of decreased tension and dislocation within the material.

The carcass may be of any metallic material, such as steel which today is the most used material for carcass. The carcass may e.g. be a flexible tube provided by one or more helically wound and interlocked profiles, e.g. as described in U.S. Pat. Nos. 6,840,286, 6,282,933 and 6,889,718.

The carcass may be heated using any method, but in order to have a high degree of control of the temperature in the application section of the metal carcass it is desired to use induction heating as the heating method. Thereby the heating process can be controlled so that a sufficient temperature of the carcass in the application section of the metal carcass can be reached without risk of overheating. The heating method is also very efficient since the heat is actually generated inside the carcass material.

Methods of generating induction heating are well known in the art. Induction heating is a non-contact heating process. It uses high frequency electricity to heat materials that are electrically conductive. The source of high frequency electricity is used to drive an alternating current through a coil. This coil is known as the work coil. The work coil may preferably be applied around the carcass in the application section of the metal carcass.

The high frequency electricity may be selected dependent on the equipment used. In general the power should not be too high, taken into consideration that the steel carcass actually by use of induction heating could be heated to a temperature of 700° C. or more, it should be observed not to overheat the carcass. In practice, it has been found that a power of between 20 and 200 kWatt, such as between 50 and 80 kWatt is useful in most applications of the methods. Naturally the optimal power level depends largely on the velocity of the carcass through the work coil, the thickness of the steel and the number of windings on the work coil.

The velocity of the carcass through the work coil is also called the carcass feeding velocity. The carcass feeding velocity may preferably be essentially the same as the length of the extruded material per time unit. In other words, the extruded length/minute is equal to the feeding velocity in length/minute of the carcass.

The feeding velocity of the carcass depends on the thickness of the extruded PE layer as well as the equipment used. In practice the feeding velocity of the carcass will normally be in the interval from about 0.1 to 2 m/min.

In the extrusion step the non-cross-linked polyethylene material is extruded from an extrusion head.

The distance between the extrusion head and the work coil of the induction heating system may preferably be as small as possible, e.g. down to 1 or 2 cm, provided that the induction heating applied does not interfere directly with the extrusion process e.g. result in an increased heating of the extrusion head and similar, as this may result in an undesired overheating of the non-cross-linked polyethylene material. In practice the distance along the length of the carcass to the extrusion head extruding the polyethylene material may preferably be less than 2 times the extrusion length per minute, preferably less than the extrusion length per minute.

In one embodiment the induction heating is provided by a work coil placed at a distance along the length of the carcass to an extrusion head extruding the polyethylene material, which distance is 200 cm or less, such as 100 cm or less, such as between 2 and 50 cm, such as between 5 and 30 cm.

By applying the work coil as close to the extrusion head as described above, the temperature of the application section of the metal carcass immediately prior to the application of the non-cross-linked polyethylene material from the extrusion head may be controlled very precisely, since possible loss of heat between the induction heating station and the extrusion station is kept very low.

After the non-cross-linked polyethylene material has been applied onto the carcass, the carcass may in one embodiment be subjected to additional heating using induction heating to readjust the temperature of the carcass. In another embodiment the carcass is not subjected to additional heating using induction after the non-cross-linked polyethylene material has been applied, at least not until after the non-cross-linked polyethylene material has been cross-linked. In this latter embodiment the cross-linking station may be applied immediately after the extrusion station which results in reduced risk of deformation of the extruded non-cross-linked polyethylene material due to external forces such as gravity.

As mentioned above, the application section of the metal carcass should at least be heated to a temperature of 150° C. The temperature should preferably not exceed the activation temperature of the peroxide, as this may result in a too early partial cross-linking of the polyethylene material, because the extruded polyethylene material must be laid in close contact to the carcass (optionally with a foil in between as described below) prior to initiation of the cross-linking. It has also been found that a cross-linking initiated by heat transferred from a carcass may result in undesired tensioning in the cross-linked polyethylene material which may result in a weakening of the internal sheath.

In one embodiment, the step of heating the application section of the metal carcass comprises heating the application section to an application section temperature of at least 155° C.; such as at least 160° C.

In one embodiment, the step of heating the application section of the metal carcass comprises heating the application section to an application section temperature of between 10° C. below and about the temperature of the polyethylene material in the extrusion zone.

The polyethylene material may e.g. have a temperature of between 160 and 180° C. in the extrusion zone. The optimal temperature of the polyethylene material in the extrusion zone depends largely on the softening and melting characteristics of the polyethylene material and further the temperature should be below the activation temperature of the peroxide.

In one embodiment, the temperature of the polyethylene material in the extrusion zone is at least 5° C. below the activation temperature of the peroxide.

In one embodiment, the temperature of the polyethylene material in the extrusion zone is between 170 and 175° C.

In one embodiment, the step of heating the application section of the metal carcass comprises heating the application section to an application section temperature of between 30 and 5° C. below the activation temperature of the peroxide, such as between 15 and 10° C. below the activation temperature of the peroxide.

In one embodiment, the step of heating the application section of the metal carcass comprises heating the application section to an application section temperature of around or at least the melting point of the extruded not-cross-linked polyethylene material.

Polyethylene is often used for internal sheaths for offshore flexible pipes at operational temperatures up to about 60° C. Primarily the high density polyethylene (HDPE), which has a substantially linear chain structure, is used. The HDPE has a somewhat higher stiffness and mechanical strength than other polyethylene types. Also, it has a higher crystallinity and therefore a lower permeability to gases.

Preferred polyethylene materials to be used according to the invention have a density of at least 920 g/cm$^3$, such as above 940 g/cm$^3$, preferably the polyethylene has a density between 945 and 955 g/cm$^3$.

The internal sheath may in one embodiment be a co-extruded layer comprising two or more sub layers e.g. of PE with different densities. The co-extruded materials may e.g. be cross-linked in one cross-linking step using electromagnetic waves according to the invention.

In general, to obtain the best possible properties it is preferred that the polymer material comprises at least 50% by weight, preferably at least 70% by weight, more preferably at least 85% by weight of polyethylene.

The polyethylene material may in one embodiment include up to about 40% by weight, such as up to about 20% or preferably up to about 10% by weight of additional polymer(s) other than polyethylene. The additional polymer(s) may e.g. be selected from the group consisting of thermoplastics such as thermoplastic elastomers including block copolymer such as SEBS, SBS, SIS, TPE-polyether-amide, TPE-polyether-ester, TPE-urethanes, TPE PP/NBR, TPE-PP/EPDM, TPE-vulcanisates and TPE-PP/IIR; rubbers such as butadiene rubber, isoprene rubber, nitril rubber, styrene-butadiene rubber and urethane rubber; polyolefins such as polypropylene and polybutylene including its isomers; liquid crystal polymers; polyesters; polyacrylates; polyethers; polyurethane; thermoplastic vulcanisates; and Liquid Silicone Rubber.

The polyethylene material typically contains minor amounts of additives like pigments, heat stabilisers, process stabilisers, metal deactivators, flame-retardants and/or reinforcement fillers. It is preferred to keep the amount of such additives low to reduce the risk of blistering and stress induced cracking. The reinforcement fillers may e.g. include glass particles, glass fibres, mineral fibres, talcum, carbonates, mica, silicates, and metal particles.

In one embodiment, the polyethylene material layer is a co-extruded layer comprising two or more co-extruded sub layers of equal or different material compositions. These co-extruded sub layers may preferably be cross-liked in one step, whereby the material sub layers will bind to each other. Thus, in one embodiment the polyethylene material layer comprises co-extruded sub layers in the form of an innermost sub layer of a polyethylene material with a higher amount of fillers, and an outermost sub layer of a polyethylene material with a lower amount of fillers.

According to the invention the cross-linking of the polyethylene material is initiated by peroxide serving as a radical-former when activated. A specific peroxide decomposes at a specific temperature (the activation temperature of the peroxide). The decomposition causes the peroxide to release radical-formers which induce cross-linking in the polyethylene material. The temperature during the extrusion is typically above 150. The temperature during extrusion is selected to keep the polymer material in a molten state, however, the temperature should not be so high that the polyethylene material becomes too floating. Further information related to the peroxide and the cross-linking can be found in WO 03078134 which discloses a method of extruding and cross-linking a polymer liner using peroxide as radical-former for the cross-linking.

As it will be understood, cross-linking of the polyethylene material is undesired in the extruder because this will make the extrusion more difficult or even impossible. Thus, it is preferred to select a peroxide having an activation temperature above 150° C. In one embodiment, the peroxide has an activation temperature between 160 and 200° C., more preferably between 175 and 185° C.

In one embodiment, the selected peroxide has an activation temperature which is substantially above such as at least 1° C., and preferably at least 5 to 10° C. above the temperature of the polyethylene material during the extrusion.

Examples of useful peroxides include butylcumyl peroxide, dicumyl peroxide, 2,5-Dimethyl-2,5-di(tert-butylperoxy)hexyne-3, 3,3,5,7,7-Pentamethyl-1,2,4-trioxepane, hydroperoxide, 2,5-dimethyl hexane 2,5-di-t-butyl peroxide, bis(t-butylperoxy isopropyl)benzene, t-butyl cumyl peroxide, di-t-butyl peroxide, 2,5-dimethyl hexine-3 2,5-di-t-butyl peroxide and butylhydroperoxide.

Preferred peroxides include the peroxides sold under the trade names Trigonox® by Akzo Nobel Chemicals, the Netherlands, such as Trigonox 145B (2,5-Dimethyl-2,5-di(tert-butylperoxy)hexyne-3) and Trigonox 311 (3,3,5,7,7-Pentamethyl-1,2,4-trioxepane).

According to the invention the peroxide may be activated by exposing the extruded polymer material to electromagnetic waves, selected from the group consisting of infrared radiation and microwave.

The peroxide is added to the polyethylene before extrusion. The peroxide may be added in solid state as powder or granulate. Alternatively the peroxide may be added in liquid form. The polyethylene may be present in the form of granulate, powder or mixtures thereof. When the peroxide is added in liquid form, the polyethylene is in one embodiment present with at least 10% of powder.

In general, the amount of peroxide in the polyethylene material should preferably be at least 0.1% by weight of the polyethylene material, such as between 0.2 and 3% by weight of the polymer, more preferably up to about 2% or even more preferably up to about 1.5% by weight of the total polymer composition including peroxide.

To obtain a satisfactory cross-linking of the polymer material when using infrared radiation for activating peroxide, it is preferred that the polymer composition contains peroxide from 0.1 to 1.0% by weight, and preferably from 0.3 to 0.8% by weight of the total polymer.

The cross-linking step comprising the step of exposing the extruded polymer material to electromagnetic waves selected from the group consisting of infrared radiation and microwave, i.e. in the range of about 0.5 µm to 0.5 m, may be performed as described in WO 03078134. In one embodiment, the extruded polymer material is exposed to electromagnetic waves for a sufficient time to thereby raise the temperature of the extruded polymer material to at least the activation temperature of the peroxide.

In one embodiment, the cross-linking is activated by exposing the extruded polymer to electromagnetic waves with a wavelength measured in vacuum of between 0.5 µm and 20 cm, such as between 0.8 µm and 10 cm, such as between 1.0 µm and 1 cm, such as between 2.0 µm and 1000 µm In one embodiment, the cross-linking is activated by application of infrared radiation comprising wavelengths in the range 0.5-10, such as in the range 0.8-6.0 µm, such as in the range 1.0-5.0 µm.

In one embodiment, the pressure in the cross-linking zone is raised to reduce the risk of formation of bubbles and irregularities. The pressure applied in this embodiment is applied on the outer side of the polyethylene material i.e. on the side turning away from the carcass. As described below the pressure inside the carcass may be below atmospheric pressure in order to apply the extruded polyethylene material onto the carcass, and to draw it to fit regularly around the carcass.

In the cross-linking zone the temperature of the polyethylene material is raised to above 150° C. preferably to a temperature between 160 and 200° C.

The method of the invention may preferably be carried out in an in-line process, including passing the metal carcass at a feeding velocity through a heating zone wherein the application section of the metal carcass is heated, through an extrusion zone wherein the polyethylene material is extruded onto the metal carcass, to the cross-linking zone wherein the polyethylene material is cross-linked, and preferably there from to a cooling station.

The feeding velocity may preferably be as disclosed above between 0.1 and 2 m/minute.

In one embodiment, the distance between the metal carcass heating zone and the extrusion zone is less than 2 times the delivery velocity, such as between 0.1 and 2 m/minute, preferably between 0.5 and 1.0 m/minute.

The heating zone is defined as the section along the length of the carcass, where the carcass is either heated or the heat is maintained at its highest level after heating above 150° C. In case induction heating is used as heating method, the termination of the heating zone is equal to the point where the carcass exits the work coil wound around the carcass.

When induction heating is used as heating source, the length of the heating zone is defined as the zone of the carcass surrounded by the induction work coil.

The extrusion zone extends from the extrusion head to the point where the extruded polyethylene material has been laid into close contact with the carcass or optionally into close contact with a foil wound or folded directly around the carcass.

The step of bringing the polyethylene material from the extruder head into close contact with the underlying carcass (calibrating of the polyethylene layer) may e.g. be provided by applying a pressure difference between the outer side (which should have a higher pressure) and the inner side (which should have a low pressure) of the polyethylene layer. The pressure difference may for example be established by applying a vacuum within the carcass and/or by applying an over pressure outside the polyethylene layer or both. In one embodiment wherein the carcass is provide with a folded or wound foil, the pressure difference established by a vacuum in side the carcass may normally be higher than when the carcass is not provided with a foil. Usually a wound or folded foil will not be completely gas impermeable at this extrusion stage and a vacuum established inside the carcass may thus be used to bring the extruded polyethylene material into close contact with the foil. When this contact has been established the foil may become gas impermeable, because gas no longer can escape through the folding/windings. The pressure difference may be selected in accordance with the thickness and weight of the polyethylene material, also in order to avoid undesired deformation of the polyethylene layer due to gravity.

In one embodiment, the pressure difference applied over the respective sides of the polyethylene layer is sufficient to calibrate the extruded polymer layer towards the carcass.

In general it can be said that the thicker the polyethylene layer is, the larger pressure difference may be desired.

The cross-linking zone is the zone wherein the polyethylene material is subjected to electromagnetic waves with a wavelength of between 0.5 µm to 0.5 m to be heated to above the activation temperature of the peroxide.

In one embodiment, the distance between the extrusion zone and the cross-linking zone is less than 2 times the delivery velocity, such as such as between 0.1 and 2 m/minute, preferably between 0.5 and 1.0 m/minute.

The heating zone may in principle have any length, also depending on the feeding velocity. In practice, a length of the heating zone between 10 and 500 cm, such as between 50 and 150 cm, has been found adequate.

If the heating zone is too short, there may be a risk of uneven heating of the carcass section. If the heating section is longer than needed, the heating steep may be unnecessarily expensive and may require unnecessary space.

As mentioned above, the method of the invention may in one embodiment comprise the step of applying a foil onto the metal carcass prior to the step of heating the metal carcass, the polyethylene material being extruded onto said foil.

From the prior art it is known to apply such a foil and further information relating to the application may be found in e.g. WO 03078134 and WO 05028198, which hereby are incorporated by reference with respect to the method of applying the foil and the selection of foil.

The foil should preferably have a thickness of 2 mm or less in order to be applied in a simple fashion and to maintain an adequate flexibility of the resulting pipe. In one embodiment, the thickness of the foil is between 0.075 and 1 mm, such as between 0.1 and 0.2 mm.

The foil may preferably be wound or folded onto the carcass e.g. with overlapping edges.

In one embodiment, the foil is wound with overlapping edges of between 10 and 60%, more preferably around 50%, as this results in a very even foil layer.

In one embodiment, the foil is a polymer foil with a melting temperature above 150° C., preferably above the extrusion temperature of the polyethylene material e.g. a foil of polyester.

In one embodiment, the foil is a steel foil, e.g. made from the same steel composition as the carcass to avoid the risk of galvanic corrosion of the metals.

The polyethylene material may preferably be extruded with a thickness of 4 mm or more, such as 6 mm or more, such as 8 mm or more, such as 10 mm or more, such as 12 mm or more, such as 14 mm or more, such as 16 mm or more, such as 18 mm or more. As indicated above, the thickness of the polyethylene layer may e.g. be provided as the total thickness of two or more sub-layers.

The cross-linked polyethylene material is cooled as it is known in the art to cool extruded elements. In one embodiment, the cooling step is performed by water, preferably by subjecting the pipe to a water bath.

In one embodiment, the cross-linked polyethylene material is passed from the cross-linking zone and through a water bath cooling the cross-linked polyethylene material from its outer side. The water bath may preferably have a length of at least 10 m, such as between 25 and 50 m. Between the cross-linking zone and the water bath may be a short distance e.g. between 10 and 200 cm, such as around 50 cm wherein the pipe is subjected to cooling by air.

The method of the invention may further comprise the steps of applying additional layers onto the internal sealing sheath. The additional layers preferably comprise one or more armouring layers and/or one or more polymer layers, wherein at least one of the additional layers is not bonded to another layer of the flexible pipe.

The armouring layers on the outer side of the internal sheath may e.g. be of a composite material e.g. as disclosed in WO 02095281. Alternatively the armouring layers may be of metal profiles helically wound e.g. as disclosed in WO 0036324 and WO0181809.

The one or more outer armouring layers may preferably be in the form of helically wound steel wires e.g. shaped as profiles, where the individual layers may be wound at different winding angle relative to the pipe axis.

By using the method of the invention it has surprisingly been found that the degree of cross-linking of the polyethylene internal sheath may be highly increased e.g. to an average degree of cross-linking of the polyethylene material obtained of at least 85, such as between 90 and 98%. Such high degrees in such relatively thick liners have not hitherto been obtained in practice. Furthermore, the average degree of cross-linking of the polyethylene material obtained in the cross-linked internal sheath, excluding an inner and an outer skin layer of 0.3 mm (i.e. basic inner sealing sheath) is at least 91%, such as between 92 and 98%.

During the process smaller amounts of the peroxide may evaporated from the polyethylene material, e.g. due to the pressure difference applied over the polyethylene layer and/or due to the high temperature of the material. Therefore it has been observed that in a thin skin layer of the cross-linked polyethylene, the cross-linking degree may be somewhat below the cross-linking degree in the remaining thickness of the polyethylene layer. The layer between the polyethylene skin layers is referred to as the basic inner sealing sheath The cross-linking degrees are measured using ASTM D 2765-01.

The invention also relates to a flexible pipe obtainable by the method of the invention, wherein the internal sealing sheath is of a cross-linked polyethylene material, and preferably has an average cross-linking degree of at least 85%.

In one embodiment of the flexible pipe of the invention, the pipe comprises a metal carcass and an internal sealing sheath extruded onto the carcass, wherein said internal sealing sheath is of a cross-linked polyethylene material, having an average cross-linking degree of at least 91%.

In one embodiment of the flexible pipe of the invention the pipe comprises a metal carcass and an internal sealing sheath extruded onto the carcass, wherein said internal sealing sheath has an outer skin layer and an inner skinner layer each of a thickness of 0.3 mm, and the layer there between is designated the basic inner sealing sheath, said basic inner sealing sheath has an average cross-linking degree of at least 91%, preferably of at least 93%.

In one embodiment of the flexible pipe of the invention the pipe comprises a metal carcass and an internal sealing sheath extruded onto the carcass, wherein said internal sealing sheath has an outer skin layer and an inner skinner layer each of a thickness of 0.3 mm, and the basic inner sealing sheath there between has a homogeneity in cross-linking degree in the thickness direction which varies less than 25%, such as less than 20%.

As mentioned above, the flexible pipe of the invention comprises an internal sheath which forms a barrier against the outflow of the fluid which is conveyed through the pipe, and an inner armouring layer in the form of a carcass. The flexible pipe may comprise additional layers such as one or more armouring layers on the outer side of the internal sheath (outer armouring layer(s)), and one or more intermediate polymer layers, and furthermore an outer sheath may be provided with the object of forming a barrier against the ingress of fluids from the pipe surroundings to the armouring layers.

The armouring layers on the outer side of the internal sheath may e.g. be of a composite material e.g. as disclosed in WO 02095281. Alternatively the armouring layers may be of metal profiles helically wound e.g. as disclosed in WO 0036324 and WO0181809.

BRIEF DESCRIPTION OF DRAWINGS

The invention will be explained more fully below in connection with a preferred embodiment and with reference to the drawings in which:

FIG. 1 shows as sketch of an inline production of a flexible pipe according to the invention FIG. 1 is a sketch of a production line for the production of an internal sheath for an offshore pipeline. A carcass, i.e. a metal armouring 3, of an offshore pipeline is unwound from a pay-off device 1 and passes through a caterpillar device 2. The carcass passes into a heating station 10 comprising an induction work coil 11, which heats the carcass to a temperature of at least 150° C. Immediately after exiting the heating station 10 the carcass enters an extrusion station 4. In the extrusion station 4 an extrusion device extrudes a polyethylene internal sealing sheath onto the carcass 3, and the extruded internal sealing sheath passes together with the carcass 3 directly to a cross-linking zone 5, where it is subjected to a treatment with electromagnetic waves, e.g. with infrared radiation. From the cross-linking zone 5 it passes into a first cooling zone 6, wherein the heated polyethylene internal sheath is cooled. From the first cooling zone 6, it passes into a second cooling zone 7, wherein it is further cooled. From the second cooling zone 7, it passes through a second caterpillar device 8 and further to a take up device 9 onto which it is wound.

EXAMPLES

Example 1

A self-interlocking carcass of 6" inner diameter (15.2 cm) is produced. The outer diameter of this steel carcass is approximately 16.7 cm. The carcass was fed with a feeding velocity of 1 m/min into a heating station comprising an induction work coil, through which the carcass was fed. The induction oven was set to provide a power of about 60 kWatt. The carcass was heated to a temperature of 170° C.

From the heating station the carcass was passed to an extrusion station, wherein a polyethylene material was extruded onto the hot carcass.

The polyethylene material had the following composition: HE187E HD-PE with a density of 955 kg/m$^3$, 0.7% by weight of peroxide (Trigonox 311) and 0.2% antioxidant (Irganox 1035 from Ciba).

The extruder was a 150 mm 24D, single screw extruder. The extrusion process is found not to be temperature sensitive. The temperature setting on the heating zones of the extruder and head ranges from 140 to 170° C. In the extrusion head the temperature was set to about 170° C. The polyethylene material was extruded in a thickness of about 10 mm. The distance between the heating zone and the extrusion zone was about 20 cm. i.e. the carcass was in the 'no men's land' between the heating zone and the extrusion zone in about 12 seconds.

After the extrusion the pipe passes through an IR oven with a capacity of 75 kW. Residence time in the oven was 30-60 seconds. The distance between the extrusion station and the IR oven was about 20 cm.

After this the carcass with internal sealing sheath was cooled with water and led through a caterpillar.

Thereafter a pressure armouring consisting of interlocked wires was spirally wound with a small pitch and a traction armour wire was spirally wound with a long pitch, and finally the pipe was coated with an outer sheet provided by extrusion.

The average cross-linking degree of the internal sheath was measured to be about 90%.

Example 2

A pipe is produced as in example 1 however with the difference that a polyester foil with a thickness of about 0.125 mm was wound onto the carcass prior to feeding the carcass into the heating station. The polyester foil was wound with a 50% overlap.

The average cross-linking degree was measured to be about 90%.

The cross-linking profile was as follows:

| Distance from outside | Cross-linking measured according to ASTM D 2765-01 |
| --- | --- |
| About 0.2 mm | 60.29 |
| About 0.5 mm | 88.88 |
| About 2.5 mm | 93.81 |
| About 5.0 mm | 93.55 |
| About 7.5 mm | 93.76 |
| About 9.5 mm | 92.81 |
| About 9.8 mm | 65.98 |

The innermost sample tested (the 9.8 mm measurement) was provided by material which was melted partly into interstices of the carcass. The innermost (9.7-10 mm) and the outermost (0-0.3 mm) skin layers have significant lower cross-linking degrees. This phenomenon is believed to be caused by a reduced amount of peroxide in these skin layers at the cross-linking stage, because some of the peroxide is evaporated from the skin layers in the extrusion step.

Example 3

A pipe is produced as in example 1 with the difference that a steel foil with a thickness of about 0.125 mm was wound onto the carcass prior to feeding the carcass into the heating station. The steel foil was wound with a 50% overlap.

The average cross-linking degree was measured to be above 92%.

The cross-linking profile was as follows:

| Distance from outside | Cross-linking measured according to ASTM D 2765-01 |
| --- | --- |
| About 0.2 mm | 70.40 |
| About 0.5 mm | 90.35 |
| About 2.5 mm | 94.16 |
| About 5.0 mm | 96.05 |
| About 7.5 mm | 94.10 |
| About 9.5 mm | 95.07 |
| About 9.8 mm | 70.02 |

The cross-linking degree of the polyethylene material is increased due to the presence of the steel foil. It is believed that the steel foil increases the amount of the IR waves which are reflected from the carcass or the carcass with foil.

Also in this example the innermost (9.7-10 mm) and the outermost (0-0.3 mm) skin layers have significant lower cross-linking degrees.

The invention claimed is:

1. A method of producing a flexible pipe comprising a metal carcass and an internal sealing sheath extruded onto the carcass, said method comprising the steps of
   providing a metal carcass;
   heating an application section of said carcass to an application section temperature of at least about 150° C.;
   extruding a non-cross-linked polyethylene material comprising a peroxide having an activation temperature above about 150° C. onto said application section of said carcass;
   cross-linking the extruded polyethylene in a cross-linking zone by raising its temperature to at least the activation temperature of said peroxide by exposing the extruded polymer material to electromagnetic waves, with a wavelength of between about 0.5 μm to about 0.5 m; and
   cooling said cross-linked polyethylene material to obtain the internal sealing sheath.

2. A method as claimed in claim 1 wherein the application section of said metal carcass is heated to the application temperature using induction heating.

3. A method as claimed in claim 2 wherein the induction heating is provided by a coil placed at a distance along the length of the carcass to an extrusion head extruding the polyethylene material which distance is less than about two times the extrusion length per minute.

4. A method as claimed in claim 2 wherein the induction heating is provided by a coil placed at a distance along the length of the carcass to an extrusion head extruding the polyethylene material which distance is about 200 cm or less.

5. A method as claimed in claim 1 wherein the carcass section onto which the polyethylene material has been extruded is not subjected to further heating using induction heating.

6. A method as claimed in claim 1 wherein said metal carcass is of steel.

7. A method as claimed in claim 1 wherein said metal carcass is a flexible tube provided by one or more helically wound and interlocked profiles.

8. A method as claimed in claim 1 wherein said step of heating the application section of the metal carcass comprises heating the application section to an application section temperature of at least about 155° C.

9. A method as claimed in claim 1 wherein said step of heating the application section of the metal carcass comprises heating the application section to an application section temperature of between about 30° C. and about 5° C. below the activation temperature of the peroxide.

10. A method as claimed in claim 1 wherein said step of heating the application section of the metal carcass comprises heating the application section to an application section temperature of at least about the melting point of the extruded not-cross-linked polyethylene material.

11. A method as claimed in claim 1 wherein said polyethylene material has a density of at least about 920 g/cm$^3$.

12. A method as claimed in claim 1 wherein said polyethylene material prior to extrusion comprises at least about 70% by weight of polyethylene.

13. A method as claimed in claim 1 wherein said polyethylene material comprises up to about 10% by weight of fillers.

14. A method as claimed in claim 1 wherein said polyethylene material prior to extrusion comprises up to about 30% by weight of additional polymer(s) other than polyethylene.

15. A method as claimed in claim 1 wherein the amount of peroxide in the polymer material is at least about 0.1% by weight of the polyethylene material.

16. A method as claimed in claim 15 wherein the amount of peroxide in the polymer material is between about 0.1% and about 1.0% by weight.

17. A method as claimed in claim 1 wherein the peroxide has an activation temperature above about 150° C.

18. A method as claimed in claim 1 wherein the peroxide is selected from butylcumyl peroxide, dicumyl peroxide, 2,5-Dimethyl-2,5-di(tert-butylperoxy)hexyne-3,3,3,5,7,7-Pentamethyl-1,2,4-trioxepane, hydroperoxide, 2,5-dimethyl hexane 2,5-di-t-butyl peroxide, bis(t-butylperoxy isopropyl) benzene, t-butyl cumyl peroxide, di-t-butyl peroxide, 2,5-dimethyl hexine-3 2,5-di-t-butyl peroxide, butylhydroperoxide and mixtures thereof.

19. A method as claimed in claim 18, wherein the peroxide is 3,3,5,7,7-Pentamethyl-1,2,4-trioxepane.

20. A method as claimed in claim 1 wherein the cross-linking is activated by exposing the extruded polyethylene material to electromagnetic waves with a wavelength measured in vacuum of between about 0.5 μm and about 20 cm.

21. A method as claimed in claim 20 wherein the cross-linking is activated by application of infrared radiation.

22. A method as claimed in claim 1 wherein the pressure in the cross-linking zone is raised to avoid formation of bubbles and irregularities.

23. A method as claimed in claim 1 wherein the extruded polyethylene material is subjected to a treatment with infrared radiation in said cross-linking zone, the temperature of the polyethylene material being raised to above about 150° C.

24. A method as claimed in claim 1 wherein the average degree of cross-linking of the polyethylene material obtained is at least about 85%.

25. A method as claimed in claim 1 wherein the average degree of cross-linking of the polyethylene material obtained in the cross-linked internal sheath, excluding an inner and an outer layer of 0.3 mm is at least about 91%.

26. A method as claimed in claim 1 wherein the extrusion and cross-linking steps are carried out in an in-line process, including passing the metal carcass with a delivery velocity through a heating zone wherein the application section of the metal carcass is heated, though an extrusion zone wherein the polyethylene material is extruded onto the metal carcass, to the cross-linking zone wherein the polyethylene material is cross-linked.

27. A method as claimed in claim 26 wherein the feeding velocity is between about 0.1 m/minute and about 2 m/minute.

28. A method as claimed in claim 26 wherein the distance between the metal carcass heating zone and the extrusion zone is less than about two times the feeding velocity.

29. A method as claimed in claim 26 wherein the distance between the extrusion zone and the cross-linking zone is less than about two times the feeding velocity.

30. A method as claimed in claim 26 wherein the heating zone has a length of between about 10 cm and about 500 cm.

31. A method as claimed in claim 26, wherein a vacuum is applied inside the carcass to calibrate the extruded polymer layer towards the carcass.

32. A method as claimed in claim 1 further comprising the step of applying a foil onto the metal carcass prior to the step of heating the metal carcass, the polyethylene material being extruded onto said foil.

33. A method as claimed in claim 32 wherein the foil has a thickness of up to about 2 mm.

34. A method as claimed in claim 32 wherein the foil is wound or folded onto the carcass.

35. A method as claimed in claim 32 wherein the foil is of a material selected from a metal and a polymer.

36. A method as claimed in claim 1 wherein the polyethylene material is extruded with a thickness of about 4 mm or more.

37. A method as claimed in claim 1 wherein the cross-linked polyethylene material is cooled in the cooling step by water cooling.

38. A method as claimed in claim 37 wherein the cross-linked polyethylene material is passed from the cross-linking zone and through a water bath cooling the cross-linked polyethylene material from its outer side.

39. A method as claimed in claim 1 further comprising the step of applying additional layers onto the internal sealing sheath wherein at least one of the additional layers is not bonded to another layer of the flexible pipe.

* * * * *